(12) United States Patent
Yamashita et al.

(10) Patent No.: US 10,087,759 B2
(45) Date of Patent: Oct. 2, 2018

(54) ELECTRIC COMPRESSOR

(71) Applicant: KABUSHIKI KAISHA TOYOTA JIDOSHOKKI, Kariya-shi, Aichi-ken (JP)

(72) Inventors: Takuro Yamashita, Aichi-ken (JP); Tatsuya Ito, Aichi-ken (JP); Tetsuya Yamada, Aichi-ken (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 345 days.

(21) Appl. No.: 14/867,283

(22) Filed: Sep. 28, 2015

(65) Prior Publication Data
US 2016/0090987 A1    Mar. 31, 2016

(30) Foreign Application Priority Data
Sep. 30, 2014 (JP) .................................. 2014-201128

(51) Int. Cl.
*F04B 39/14* (2006.01)
*F01C 21/00* (2006.01)
(Continued)

(52) U.S. Cl.
CPC ............ *F01C 21/007* (2013.01); *F04B 35/04* (2013.01); *F04B 39/121* (2013.01); *F04B 39/14* (2013.01);
(Continued)

(58) Field of Classification Search
CPC ........ F04B 39/14; F04B 35/04; F04B 39/121; F04C 27/008; F04C 2240/808;
(Continued)

(56) References Cited

U.S. PATENT DOCUMENTS

| 1,523,817 | A | * | 1/1925 | Long ....................... | F16L 23/20 |
| | | | | | 277/609 |
| 4,272,109 | A | * | 6/1981 | Ahlstone ............... | E21B 17/085 |
| | | | | | 277/609 |
| 4,784,396 | A | * | 11/1988 | Scott ..................... | F16B 41/002 |
| | | | | | 277/598 |
| 6,926,286 | B2 | * | 8/2005 | Shibata .................. | F16J 15/061 |
| | | | | | 277/598 |
| 6,953,357 | B2 | | 10/2005 | Fukushima et al. | |
| 2005/0063836 | A1 | * | 3/2005 | Kimura ................. | F04B 39/121 |
| | | | | | 417/313 |
| 2009/0010786 | A1 | * | 1/2009 | Koide ..................... | F01C 21/10 |
| | | | | | 417/423.14 |

(Continued)

FOREIGN PATENT DOCUMENTS

| DE | 102004019606 A1 | 11/2004 |
| JP | 09-112699 A | 5/1997 |

(Continued)

OTHER PUBLICATIONS

Communication dated Jun. 15, 2018, from the German Patent and Trademark Office in application No. 102015116052.8.

*Primary Examiner* — Peter J Bertheaud
*Assistant Examiner* — Dnyanesh Kasture
(74) *Attorney, Agent, or Firm* — Sughrue Mion, PLLC

(57) ABSTRACT

An electric compressor includes an inverter housing accommodating an inverter, a compressor housing accommodating a compression mechanism and an electric motor, and a seal member having an annular shape and interposed between an end surface of a peripheral wall of the compressor housing and an end surface of the inverter housing. The compressor housing has the peripheral wall in which the inverter is disposed. The seal member is retained to the inverter housing by a retaining structure which is disposed inside the peripheral wall of the compressor housing. The retaining structure includes a first projection and a second projection. The first projection is formed on the seal member and (Continued)

projects radially inward. The second projection is formed on the inverter housing. The first projection is located between the second projection and the end surface of the inverter housing so as to restrict movement of the seal member in a direction.

6 Claims, 7 Drawing Sheets

(51) Int. Cl.
| | |
|---|---|
| *H02K 5/10* | (2006.01) |
| *F04B 35/04* | (2006.01) |
| *F04C 27/00* | (2006.01) |
| *F04B 39/12* | (2006.01) |
| *H02K 11/33* | (2016.01) |
| *H02K 5/22* | (2006.01) |

(52) U.S. Cl.
CPC ............. *F04C 27/008* (2013.01); *H02K 5/10* (2013.01); *F04C 2240/30* (2013.01); *F04C 2240/808* (2013.01); *H02K 5/225* (2013.01); *H02K 11/33* (2016.01)

(58) Field of Classification Search
CPC ..... F04C 2240/30; F01C 21/007; H02K 5/10; H02K 5/225; H02K 11/33
See application file for complete search history.

(56) References Cited

U.S. PATENT DOCUMENTS

2010/0209266 A1\* 8/2010 Ikeda ................... F04B 35/04
417/410.1

FOREIGN PATENT DOCUMENTS

| JP | 2002-372152 A | 12/2002 |
|---|---|---|
| JP | 2005-233315 A | 9/2005 |
| JP | 2006-170358 A | 6/2006 |
| JP | 2007-224902 A | 9/2007 |
| JP | 2010-281426 A | 12/2010 |

\* cited by examiner

ELECTRIC COMPRESSOR

BACKGROUND OF THE INVENTION

The present invention relates to an electric compressor having an inverter unit that is integrally equipped and drives an electric motor.

An electric compressor is known in the art which includes a housing accommodating therein a compression mechanism and an electric motor. The housing has an inverter unit that is integrated therewith and has mounted thereon electronic components for driving and controlling of the electric motor. The electronic components mounted on the inverter unit need to be insulated from the outside. For this purpose, the inverter unit is mounted to the housing of the electric compressor through a seal member to seal the electronic components. Generally, a gasket or an O-ring is used as a means for sealing the housing.

Japanese Patent Application Publication No. 2002-372152 discloses a structure for mounting a gasket, according to which a cover member is mounted to its mating member through the gasket without allowing the gasket to be dropped from the cover member. In the structure of the above-cited Publication, the gasket is used for sealing between a cylinder head cover (or the cover member) of an engine for a vehicle and a cylinder head (or the mating member) or sealing between an oil pan (or the cover member) and a cylinder block (or the mating member).

The gasket is of an annular shape and has connecting portions radially extending from predetermined positions of the annular gasket and pins extending upwardly and downwardly from the connecting portions. The cover member has therein an annular groove and a plurality of positioning holes. The mating member also has therein positioning holes. The gasket and the upper portions of the pins are respectively inserted in the annular groove and the positioning holes of the cover member for preventing the gasket from falling. Then, the lower portions of the pins are inserted in the respective positioning holes of the mating member and the cover member is fixed through the gasket to the mating member by fasteners.

Japanese Patent Application Publication No. 2005-233315 discloses a structure for mounting an O-ring to a casing or a cover of an engine or a pump that need be sealed. The structure in the above Publication prevents the O-ring from being removed or falling from an annular groove. The O-ring has a plurality of projections formed at predetermined intervals. A pump casing has therein an annular groove in which the O-ring is mounted. Cutouts are formed in the groove walls of the annular groove. The O-ring inserted in the annular groove receives an appropriate pressure force from the projections inserted in the cutouts of the groove, thus the O-ring being prevented from falling from the annular groove.

In the structures of the above two Publications, the seal members, or the gasket and the O-ring, are mounted in the annular grooves in the cover member and the pump casing, respectively, so that the seal members are prevented from being removed therefrom. However, in an electric compressor having an inverter unit integrated therewith, it is difficult to form in the housing or the inverter unit an annular groove for receiving a seal member because the inverter unit has therein many electronic components and yet there has been a demand for downsizing of the inverter unit. Therefore, the assembling of the inverter unit and the seal member is complicated and it is required such assembling be performed manually. Furthermore, when the seal member is handled manually, the seal member tends to be unstable, and correct positioning of the seal member relative to the housing becomes difficult. That makes the assembling work complicated.

The present invention is directed to providing an electric compressor that makes easy the assembling of an inverter housing while a seal member interposed.

SUMMARY OF THE INVENTION

In accordance with one aspect of the present invention, there is provided an electric compressor that includes an inverter housing accommodating an inverter, a compressor housing accommodating a compression mechanism and an electric motor, and a seal member having an annular shape and interposed between an end surface of a peripheral wall of the compressor housing and an end surface of the inverter housing. The compressor housing has the peripheral wall in which the inverter is disposed. The seal member is retained to the inverter housing by a retaining structure which is disposed inside the peripheral wall of the compressor housing. The retaining structure includes a first projection and a second projection. The first projection is formed on the seal member and projects radially inward. The second projection is formed on the inverter housing. The first projection is located between the second projection and the end surface of the inverter housing so as to restrict movement of the seal member in a direction in which the compressor housing and the inverter housing are connected together.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which.

DETAILED DESCRIPTION OF THE EMBODIMENTS

First Embodiment

Figure 1:
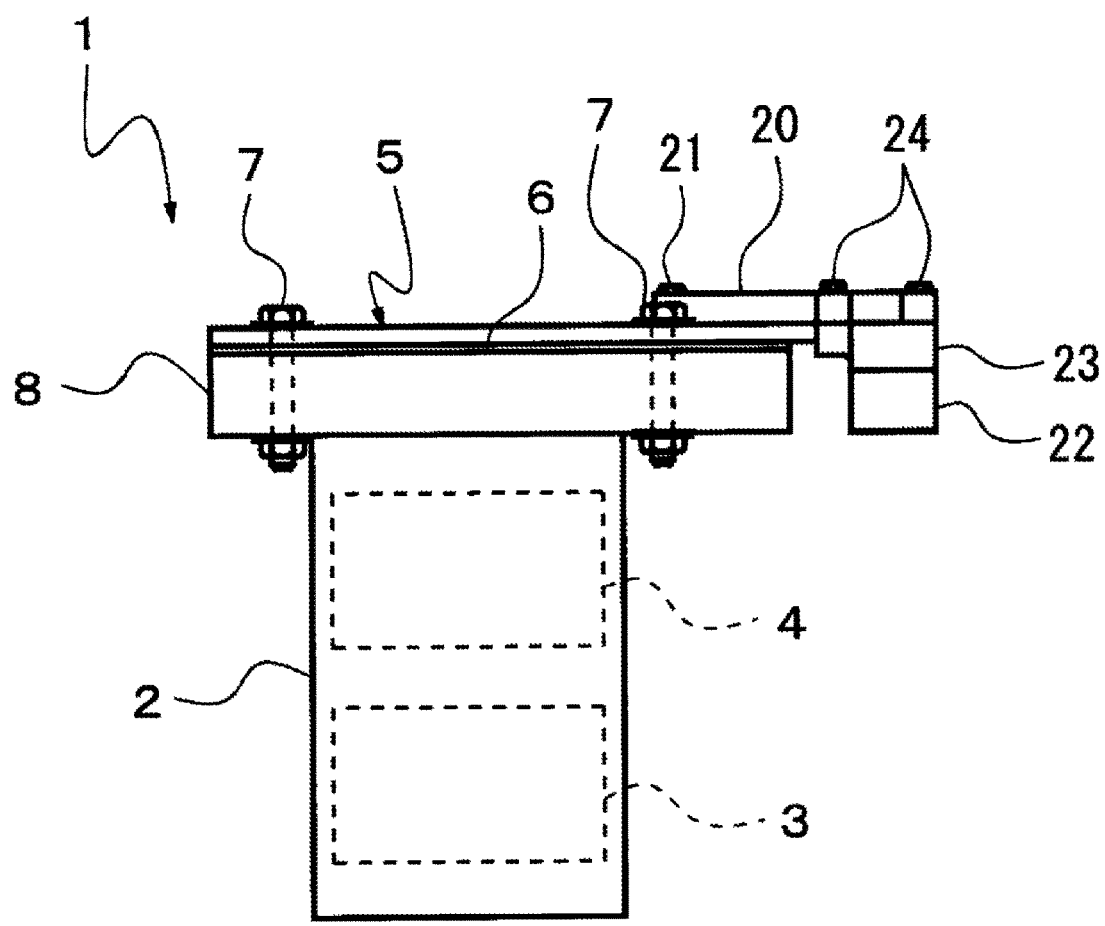
FIG. 1 is a schematic front view of an electric compressor according to a first embodiment of the present invention.

The following will describe an electric compressor according to a first embodiment of the present invention with reference to FIGS. 1 through 6. It is noted that in the following description, the upper side and the lower side of the drawings shown in front view correspond to the upper side and the lower side of the electric compressor, respectively. Referring to FIG. 1, the electric compressor, which is designated by reference numeral 1 includes a compressor housing 2 made of a metal and having therein a well-known compression mechanism 3 having vanes or scrolls to form compression chambers and an electric motor 4 driving the compression mechanism 3. The electric compressor according to the present embodiment is an example of compressors adapted for used in a vehicle air conditioner. An inverter unit 5 for driving and controlling of the electric motor 4 is integrally fixed to one end of the compressor housing 2 while a seal member 6 interposed therebetween, by a plurality of bolts 7.

Figure 2A:
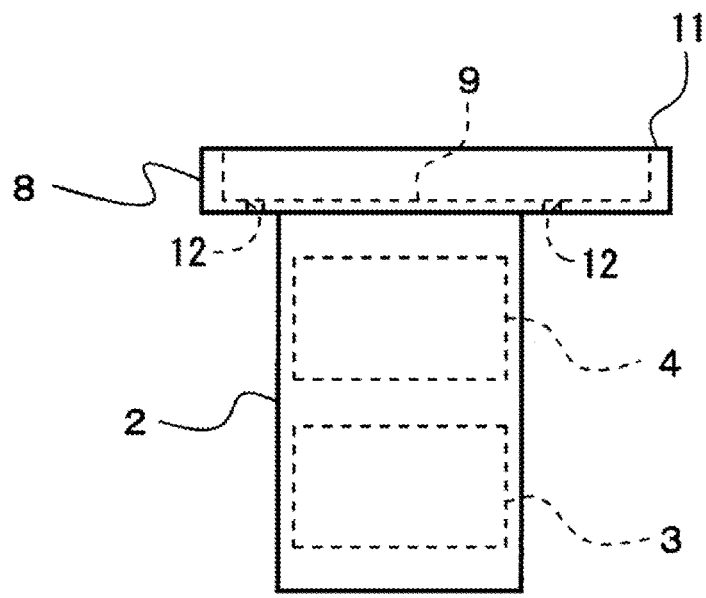
FIG. 2A is a front view of a housing of the electric compressor of FIG. 1.
Figure 2B:
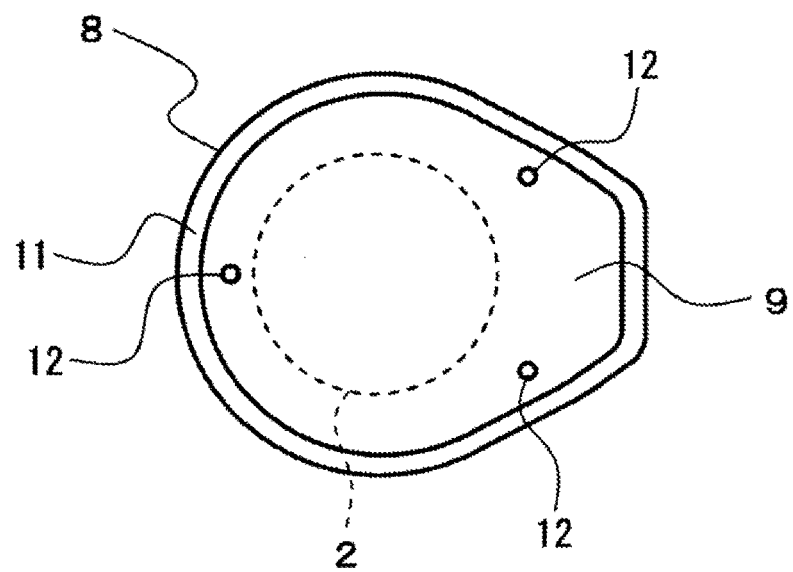
FIG. 2B is a plan view of the housing of the electric compressor of FIG. 1.

As shown in FIGS. 1, 2A and 2B, a peripheral wall 8 accommodating an inverter unit 5 is provided on the one end of the metal compressor housing 2. The peripheral wall 8 is of a bottomed cylindrical shape having a generally flat bottom wall 9. The peripheral wall 8 has a height that permits to accommodate electronic components 18 of the inverter unit 5 which will be described later. The peripheral wall 8 has an upper end surface 11 that is annular and flat, serving as the surface with which a seal member 6 is in contact. The bottom wall 9 has therethrough three holes 12 through which the bolts 7 are inserted to fix the inverter unit 5 to the compressor housing 2 while the seal member 6 is interposed therebetween.

Figure 3A:
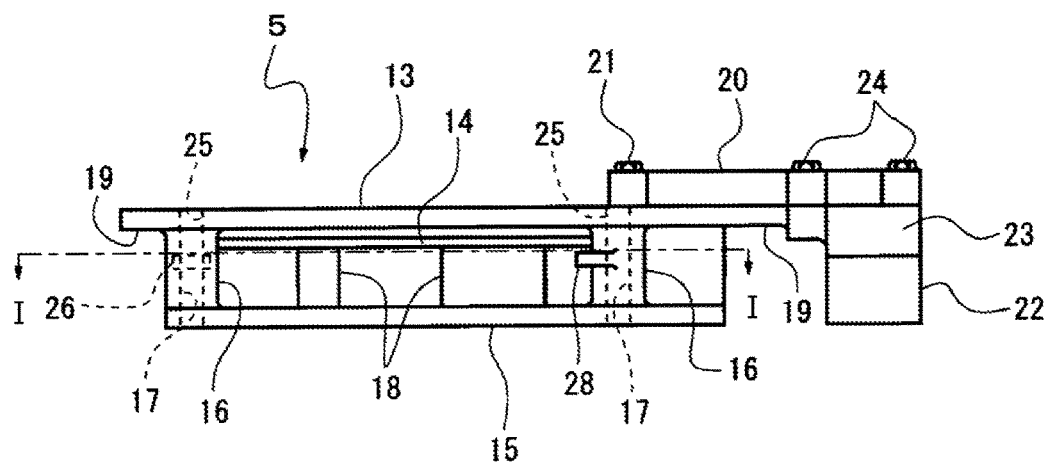
FIG. 3A is a front view of an inverter unit of the electric compressor of FIG. 1.
Figure 3B:
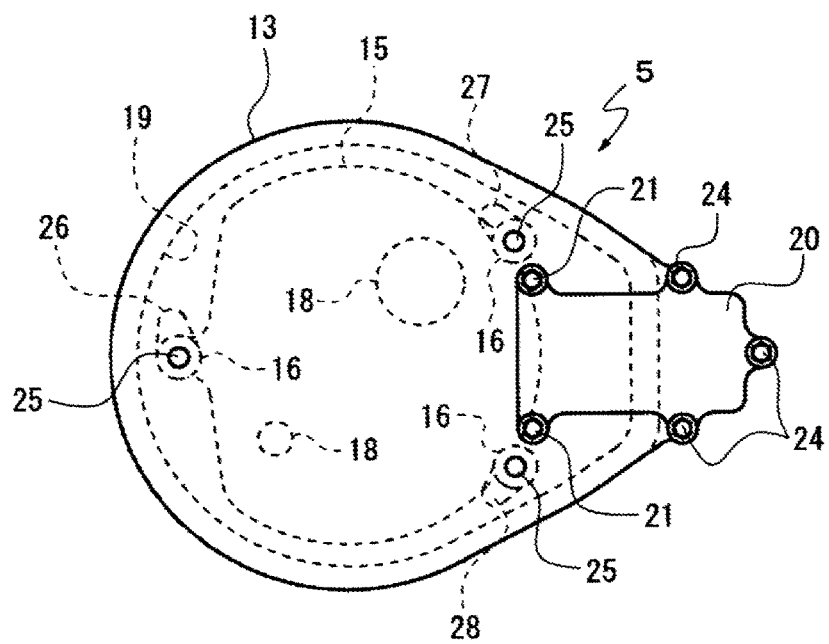
FIG. 3B is a plan view of the inverter unit of the electric compressor of FIG. 1.
Figure 4:
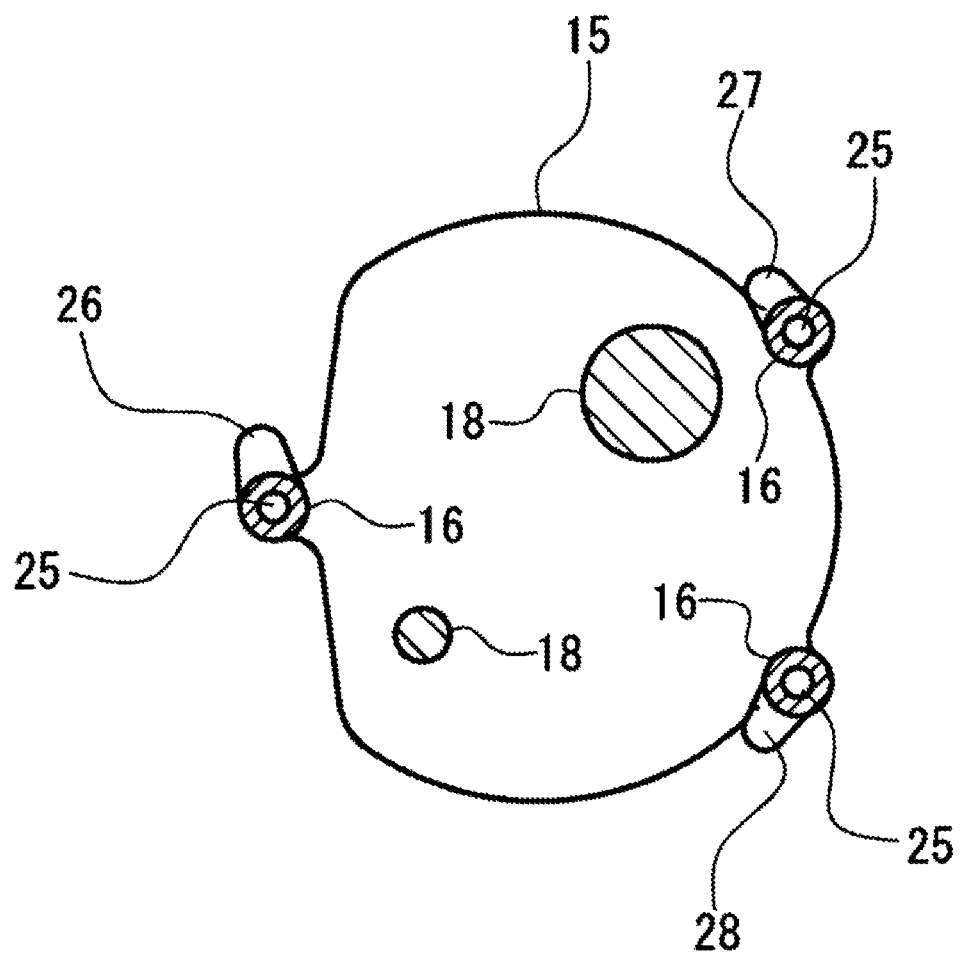
FIG. 4 is a sectional view taken along the line I-I of FIG. 3A.

As shown in FIGS. 3 and 4, the inverter unit 5 includes an inverter cover 13 that is of a plate shape and made of a resin, a circuit board 14, and a heat dissipation base 15 that is of a plate shape and made of an aluminum alloy. The base 15 has three legs 16 extending upward therefrom and made of aluminum alloy. The legs 16 of the base 15 are fixed to the lower surface of the inverter cover 13 so that a space is formed between the base 15 and the inverter cover 13 by the legs 16. It is noted that the number of the legs 16 is not limited to three, but it may be two or more. Each leg 16 has therethrough a hole 17 through which the bolt 7 (seen in FIG. 1) is inserted. The holes 17 extend to penetrate the base 15. The inverter cover 13, the base 15, and the legs 16 correspond to "inverter housing" of the present invention.

The circuit board 14 is disposed in the space between the inverter cover 13 and the base 15 and fixed to the base 15. A plurality of electronic components 18 (only two components shown in FIGS. 3 and 4) is mounted on the circuit board 14. The electronic components 18 are mounted with the lower surfaces thereof set in contact with or spaced from the upper surface of the base 15 with a small gap. The circuit board 14 and the electronic components 18 correspond to "inverter" of the present invention.

A flat end surface 19 is formed in the outer peripheral portion on the lower surface of the inverter cover 13 and in contact with the seal member 6. The end surface 19 of the inverter cover 13 faces the annular end surface 11 formed in the peripheral wall 8 of the compressor housing 2. A mounting plate 20 is fixed to the upper surface of the inverter cover 13 by bolts 21 with a portion of the mounting plate 20 extending outside the inverter cover 13.

A holding member 23 to which an electric power input port 22 is mounted is fixed to the lower surface of the extending portion of the mounting plate 20 by bolts 24. A wire (not shown) connected to power source is connected through an electric power input port 22 to the circuit board 14. The inverter cover 13 has holes 25 through which the bolts 7 are penetrated. The holes 25 are formed at positions corresponding to the holes 17 of the legs 16.

The three legs 16 extending upward from the base 15 have thereon projections 26, 27, 28 protruding inwardly therefrom at positions inside the outer peripheral edge of the inverter cover 13. The projections 26, 27, 28 are of a flat plate shape and extend in parallel to the lower surface of the inverter cover 13 in the peripheral directions of the outer edge of the inverter cover 13. It is noted that the projections 26, 27, 28 may extend in any direction as long as the projections 26, 27, 28 are located inside the outer peripheral edge of the inverter cover 13.

Figure 5A:
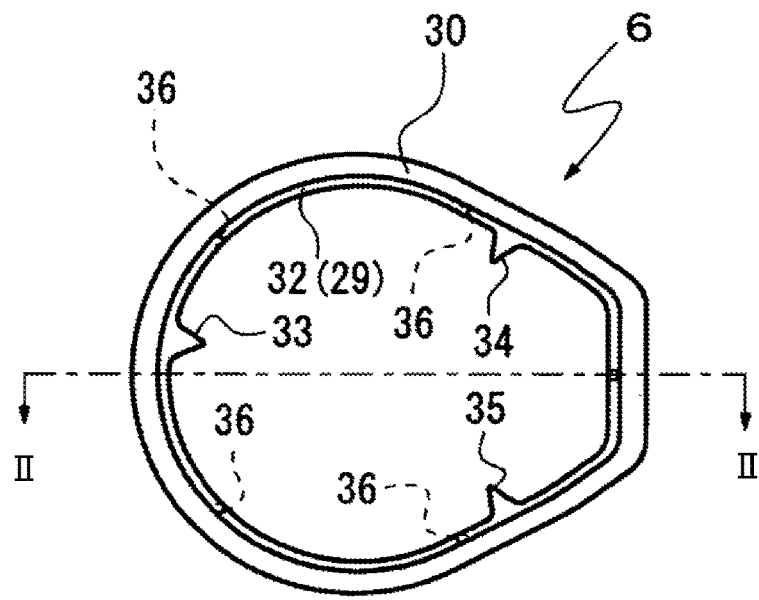
FIG. 5A is a plan view of a seal member of the electric compressor of FIG. 1.
Figure 5B:
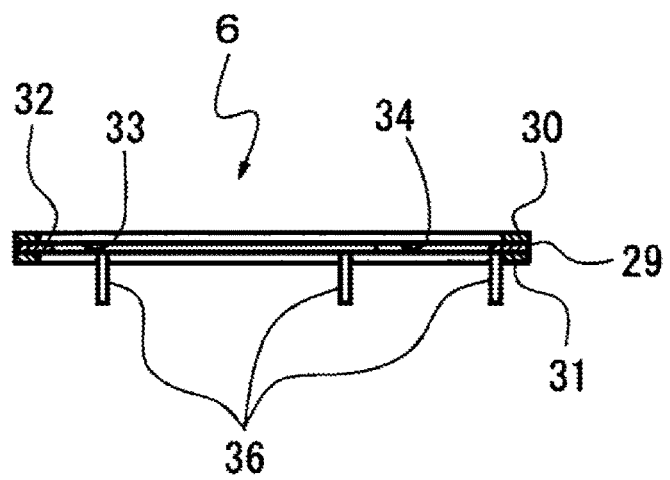
FIG. 5B is a sectional view of the seal member taken along the line II-II of FIG. 5A.

As shown in FIGS. 5A and 5B, the seal member 6 has an annular shape formed along the end surface 11 of the compressor housing 2 and the outer edge of the inverter cover 13. The seal member 6 includes a deformable ring 29 that is made of a resin and a pair of rubber seal rings 30, 31 that are fixed integrally to the upper and lower surfaces of the ring 29 by adhesive.

The ring 29 is formed with such a width that the entire inner peripheral edge of the ring 29 is located radially inwardly beyond the inner peripheral edge of the seal rings 30, 31, as indicated by 32 in FIGS. 5A and 5B. Such inner peripheral edge portion 32 of the ring 29 has projections 33, 34, 35 projecting radially inward of the ring 29 from three positions corresponding to the projections 26, 27, 28 of the legs 16 of the base 15. The projections 33, 34, 35 are of a flat plate shape. The projections 33, 34, 35 extend in parallel to and in directions that intersect the projections 26, 27, 28. The inner peripheral edge portion 32 of the ring 29 is formed with four positioning pins 36 extending downward. The projections 33, 34, 35 of the seal member 6 and the projections 26, 27, 28 of the inverter housing correspond to "first projection" and "second projection" of the present invention, respectively and cooperate to form "a retaining structure" of the present invention. The retaining structure is disposed inside the peripheral wall 8 of the compressor housing 2. The retaining structure retains the seal member 6 at a predetermined position which is between the projections 26, 27, 28 and the end surface 19 of the inverter cover 13.

Figure 6:
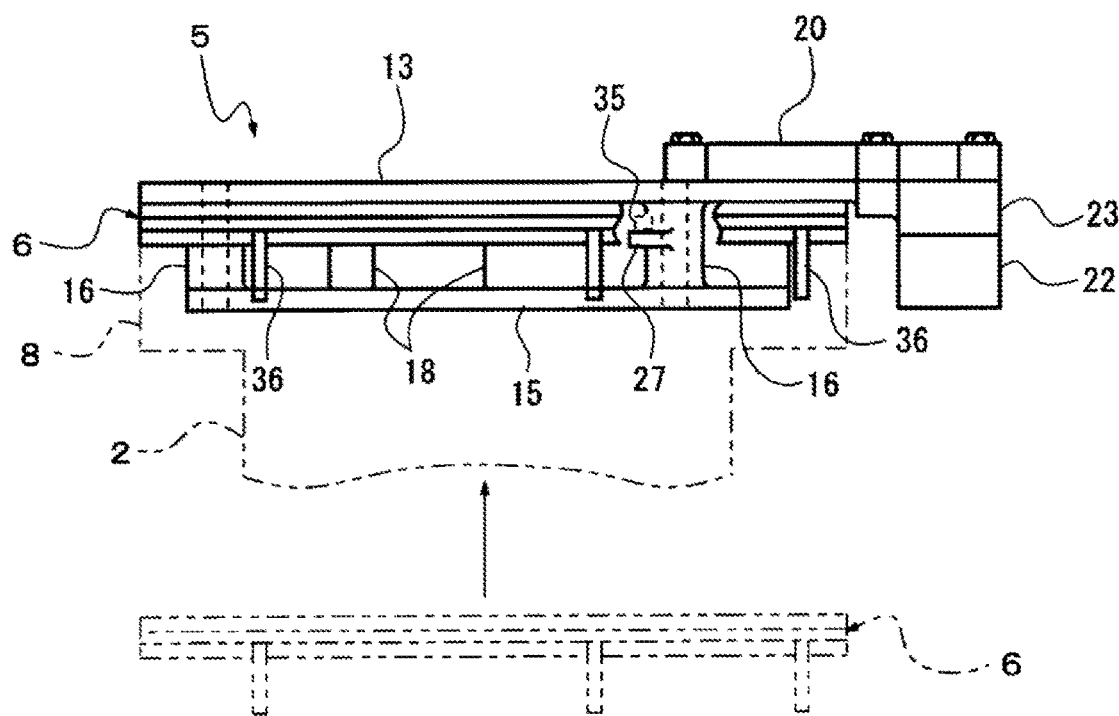
FIG. 6 is a schematic plan view illustrating a manner of assembling the seal member to the inverter unit.

The following will describe a procedure for temporally mounting the seal member 6 in the inverter housing with reference to FIG. 6. With the projections 33, 34, 35 of the seal member 6 positioned with respect to the projections 26, 27, 28 of the inverter housing, the seal member 6, which is shown in phantom lines in FIG. 6, is moved in the arrow direction toward the inverter housing. Then, the projections 33, 34, 35 located below the projections 26, 27, 28 are pressed manually until the projections 33, 34, 35 are respectively moved beyond the projections 26, 27, 28.

Pressing the seal member 6 causes the projections 33, 34, 35 to be brought into contact with the projections 26, 27, 28 and the projections 33, 34, 35 are elastically deformed, accordingly. Further pressing the seal member 6 causes the projections 33, 34, 35 to move beyond the projections 26, 27, 28, respectively. The projections 33, 34, 35 are located at a position between the projections 26, 27, 28 and the end surface 19 of the inverter cover 13 so that the movement of the projections 33, 34, 35 is limited in the direction in which the compressor housing 2 and the inverter housing are connected together or, in the axial direction of the peripheral wall 8 of the compressor housing 2. Thus, the seal member 6 is temporally mounted to the inverter housing with the projections 26, 27, 28 retained on the projections 26, 27, 28, respectively.

With the seal member 6 set in contact with the end surface 11 of the peripheral wall 8 formed in the compressor housing 2, the inverter housing in which the seal member 6 is retained in place is fixed to the compressor housing 2 by the bolts 7.

In the electric compressor according to the first embodiment in which the inverter housing and the seal member 6 respectively have therein the projections 26, 27, 28 and the projections 33, 34, 35, and the seal member 6 is retained securely in the inverter housing only by pressing the seal member 6 to the inverter housing, the inverter housing may be easily mounted to the compressor housing 2 of the electric compressor 1 without allowing the seal member 6 to be displaced.

Since the projections 26, 27, 28 of the inverter housing may be disposed in a small space and do not need a large space for forming an annular groove, the inverter housing may be prevented from becoming large in size. Further, when the leg 16 has therethrough the hole 17 for the bolt 7, the provision of a groove for engagement of the leg 16 with the projections 33, 34, 35 may reduce the strength of the leg 16. However, the structure in the first embodiment in which the leg 16 has the projections 26, 27, 28 may increase the strength of the leg 16.

Since the projections 26, 27, 28 of the inverter housing are formed of a rigid body, the projections 33, 34, 35 formed of an elastic body are easily mounted. The seal member 6 can be easily retained by the inverter housing only by manually pressing the seal member 6. The structure in which the compressor housing 2 has therein the peripheral wall 8 and the electronic components 18 of the inverter unit 5 are accommodated in the peripheral wall 8 allows the inverter cover 13 to be made of a generally simple plate shape.

The projections 26, 27, 28 of the inverter housing are formed on the legs 16 through which the bolts are inserted for fixing the inverter housing to the compressor housing 2. Thus, the leg 16 serves to fix the inverter housing as well as to prevent the seal member 6 from falling. Since the inverter housing needs no additional support pillars for forming the projections 26, 27, 28, the limited space in the inverter housing may be utilized effectively.

Second Embodiment

Figure 7:
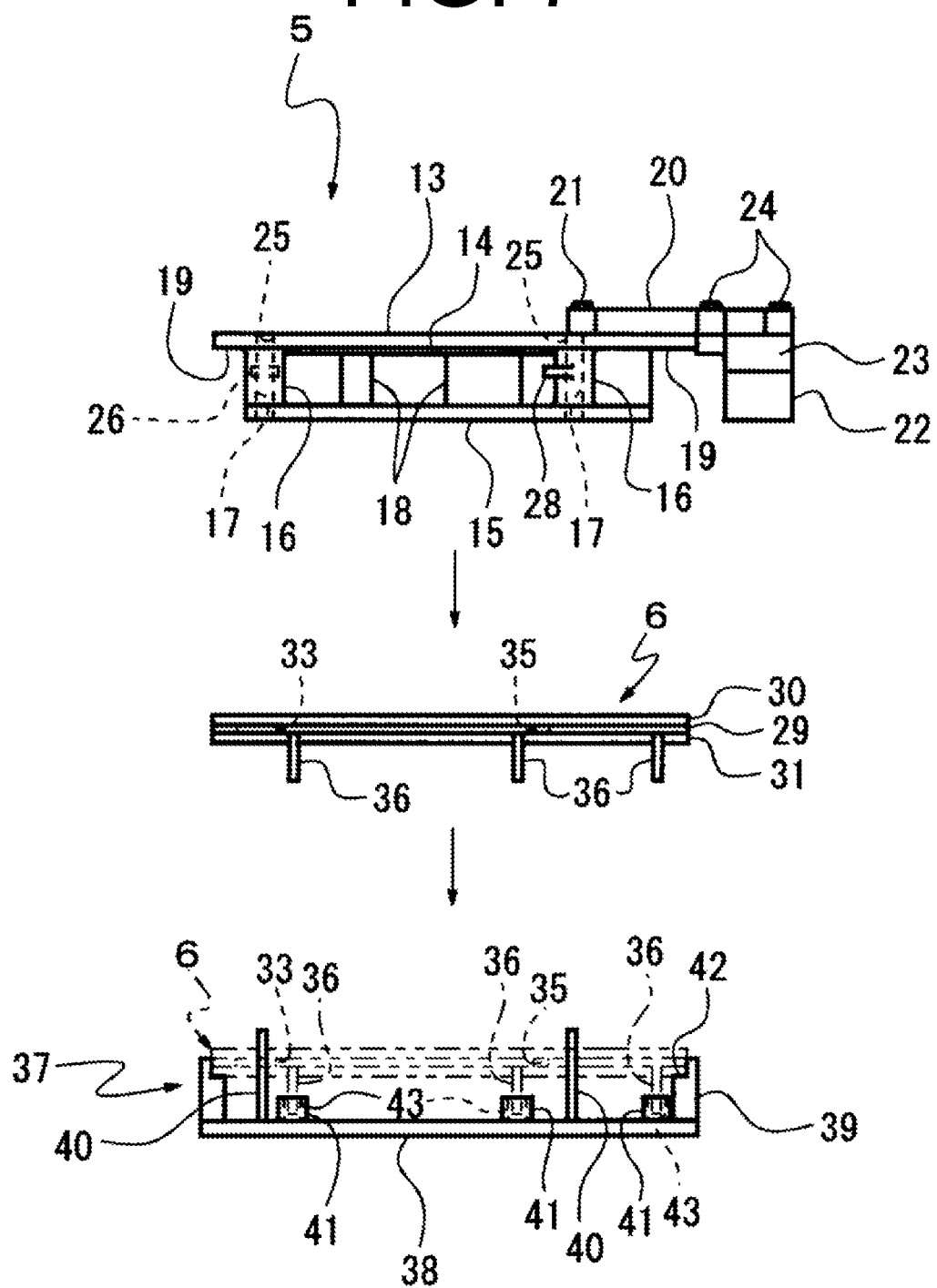
FIG. 7 is a schematic plan view illustrating a manner of assembling a seal member to an inverter unit in an electric compressor according to a second embodiment of the present invention.

The following will describe an electric compressor according to a second embodiment of the present invention with reference to FIG. 7. The same reference numerals will be used to denote those components or elements which correspond to the counterparts of the first embodiment and the description thereof will not be reiterated. In the second embodiment, a method for temporally mounting the seal member 6 to the inverter housing by using a jig 37 will be described.

The jig 37 includes a base board 38, a support member 39 mounted to the base board 38 for supporting the seal member 6, a support pin 40 that is inserted in the hole 17 of each leg 16 of the inverter unit 5, and a positioning portion 41 into which the positioning pin 36 of the seal member 6 is inserted. The support member 39 is formed annularly to correspond to the shape of the seal member 6 and has a support surface 42 for the seal member 6 at a position adjacent to the top of the support member 39.

The support pin 40 is provided for each of the three legs 16 and extends upward. The length of the support pin 40 is greater than the sum of the length of the leg 16, the hole 17 of the base 15, and the hole 25 of the inverter cover 13.

The positioning portion 41 is formed as a projection that is lower than the support member 39 and the support pin 40 and has in the center thereof a positioning hole 43 into which the positioning pin 36 of the seal member 6 may be inserted. The positioning portions 41 are disposed at positions corresponding to the respective positioning pins 36 of the seal member 6 which is placed on the support surface 42 of the support member 39.

In temporarily assembling the seal member 6 to the inverter unit 5, the seal member 6 is placed on the support surface 42 of the support member 39 with the positioning pins 36 of the seal member 6 set in alignment with the respective positioning holes 43 of the jig 37. Then, the positioning pins 36 are inserted into the positioning holes 43 thereby to position the seal member 6. Next, with the holes 17 of the legs 16 set in alignment with the respective support pins 40 of the jig 37, the inverter unit 5 is pushed toward the jig 37. By so doing, the inverter unit 5 is moved downward while being guided by the support pin 40.

During the downward movement of the inverter unit 5, the projections 26, 27, 28 of the inverter unit 5 are moved downward while elastically deforming the projections 33, 34, 35 of the seal member 6. Thus, the projections 26, 27, 28 climb over the projections 33, 34, 35. Then, the projections 26, 27, 28 change the positions with the projections 33, 34, 35 in the moving direction of the inverter unit 5.

Removing the inverter unit 5 from the jig 37 completes the temporary assembling and the seal member 6 is supported by the projections 26, 27, 28 of the inverter unit 5. As in the first embodiment, with the seal member 6 set in contact with the end surface 11 of the peripheral wall 8, the temporarily assembled inverter unit 5 and the seal member 6 are fixed to the compressor housing 2 by the bolts 7.

In the second embodiment, the use of the jig 37 allows the temporary assembly to be accomplished rapidly and easily only by placing the seal member 6 on the jig 37 and then pushing the inverter unit 5.

The present invention is not limited to the embodiments described above, but it may be modified in various ways as exemplified below within the scope of the invention.

(1) Although the seal member 6 includes the ring 29 and the seal rings 30, 31 that are fixed to the upper and lower surfaces of the ring 29, the seal member may be formed of one or more seal members that serve as a seal and are deformable, made of resin or rubber.

(2) Although the projections 26, 27, 28 and the projections 33, 34, 35 are formed in a flat plate shape, they may be of any other shape than a plate such as a bar as long as the projections 26, 27, 28 may support the projections 33, 34, 35, securely.

(3) In the first and the second embodiments, the compressor housing 2 has at one end thereof the annular peripheral wall 8 accommodating therein the electronic components 18 of the inverter unit 5. According to the present invention, however, the inverter cover may be formed in a cylindrical shape having a bottom wall and the electronic components 18 may be accommodated in the cylindrical inverter cover 13.

(4) In the second embodiment, although the support member 39 of the jig 37 is of an annular shape that corresponds to the shape of the seal member 6, the support member may be formed so as to support the seal member 6 at two or more positions.

(5) The inverter unit 5 need not necessarily be mounted to the end of the compressor housing 2, but the inverter unit 5 may be mounted at any portion on the periphery of the compressor housing 2.

(6) The projections 33, 34, 35 of the seal member 6 may be in contact with the projections 26, 27, 28 of the inverter housing in a pressed or tensioned state in temporarily assembling of the seal member 6 to the inverter unit 5. This structure helps foreign matter from being retained between the projections 26, 27, 28 and the projections 33, 34, 35 while allowing the seal member 6 to be retained at the desired position before fixing the seal member 6 to the inverter unit 5.

(7) The projections 26, 27, 28 of the inverter housing may be formed with curved surfaces as a whole so that the projections 26, 27, 28 have smooth surfaces, which helps to protect the seal member 6 from damage which may occur when the surfaces of the projections 26, 27, 28 are brought in contact with the seal member 6.

What is claimed is:

1. An electric compressor comprising:
    an inverter housing accommodating an inverter;
    a compressor housing accommodating a compression mechanism and an electric motor, wherein the compressor housing has a peripheral wall in which the inverter is disposed;
    a seal member having a substantially annular shape and interposed between an end surface of the peripheral wall of the compressor housing and an end surface of the inverter housing; wherein the seal member is retained to the inverter housing by a retaining structure which is disposed inside the peripheral wall of the compressor housing;
    wherein the retaining structure includes a first projection and a second projection, wherein the first projection is formed on the seal member and projects radially inward, wherein the second projection is formed on the inverter housing, wherein the first projection is located between the second projection and the end surface of the inverter housing so as to restrict movement of the seal member in a direction in which the compressor housing and the inverter housing are connected together, wherein the inverter housing includes a heat dissipation base to which an electronic component is mounted, and a plurality of legs through which the inverter housing is fixed to the compressor housing, wherein at least one of the legs is provided with the second projection, wherein at least one of the legs has a hole through which a bolt is inserted, and wherein an inverter cover is fixed via the legs to the compressor housing by the bolts.

2. The electric compressor according to claim 1, wherein the inverter housing has a plurality of the second projections.

3. The electric compressor according to claim 1, wherein the first projection of the seal member is disposed at position corresponding to a position of the second projection of the inverter housing.

4. The electric compressor according to claim 1, wherein the seal member is in contact with the second projection of the inverter housing in a pressed state.

5. The electric compressor according to claim 2, wherein each of the plurality of the second projections extends from the leg in a peripheral direction with respect to an axis of the electric motor.

6. The electric compressor according to claim 2, wherein at least one of the plurality of the second projections extends from the leg in a different direction from the other of the plurality of the second projections.

* * * * *